June 13, 1961 E. SICK 2,987,954
PHOTOELECTRIC CONTROL SYSTEM, IN PARTICULAR
FOR IDENTITY MARK CONTROL
Filed June 18, 1957 2 Sheets-Sheet 1
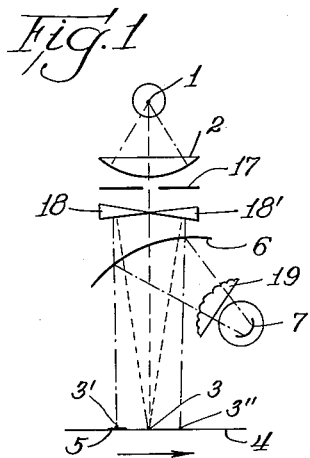
Fig. 1
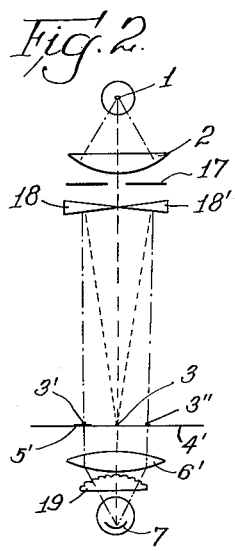
Fig. 2
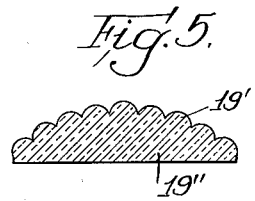
Fig. 5
Fig. 6
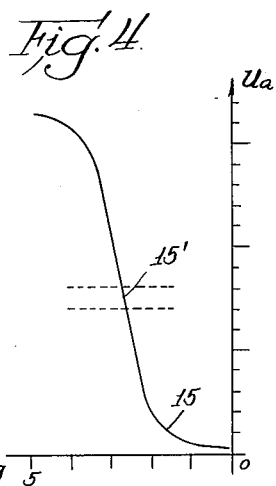
Fig. 4
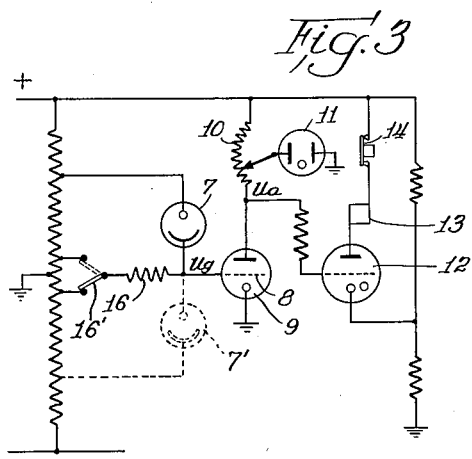
Fig. 3
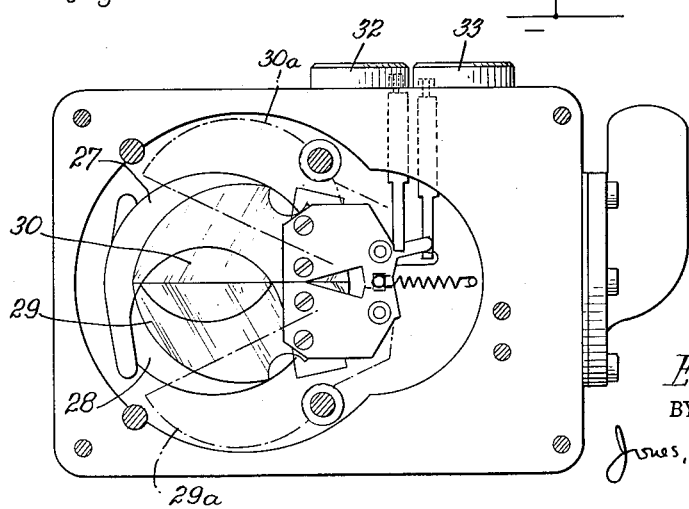
Fig. 7
INVENTOR.
Erwin Sick
BY
Jones, Davis & Robertson
Att'ys.

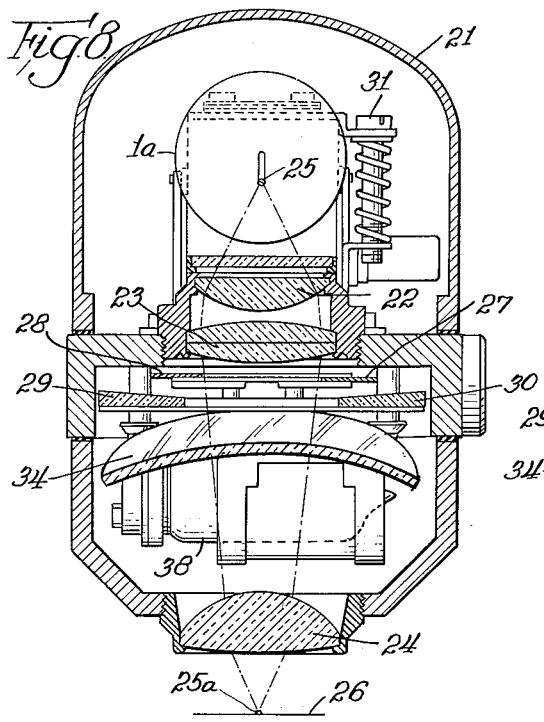
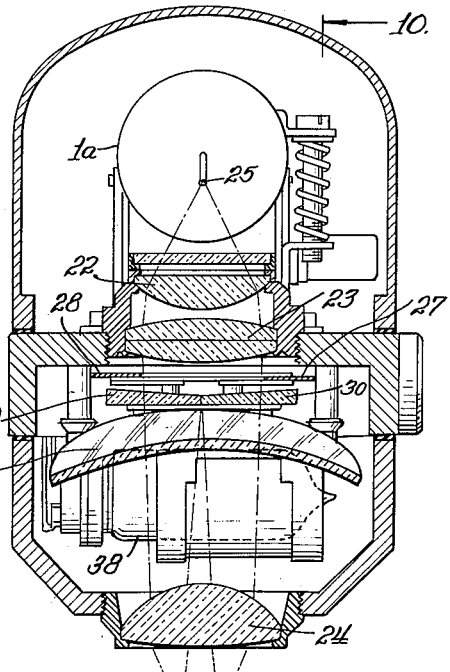
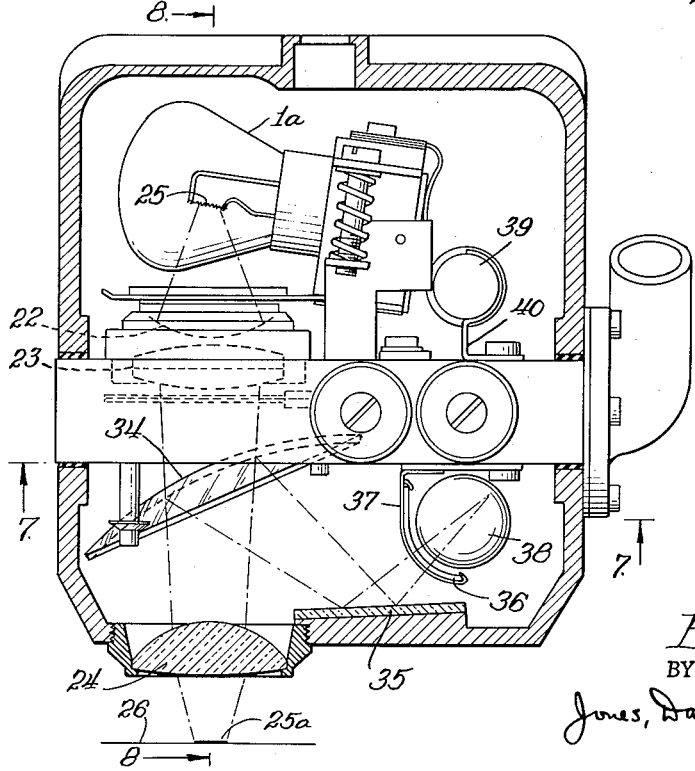

United States Patent Office 2,987,954
Patented June 13, 1961

2,987,954
PHOTOELECTRIC CONTROL SYSTEM, IN PARTICULAR FOR IDENTITY MARK CONTROL
Erwin Sick, an der Allee 7–9, Waldkirch, Breisgau, Germany
Filed June 18, 1957, Ser. No. 666,294
Claims priority, application Germany June 19, 1956
9 Claims. (Cl. 88—14)

This invention relates to a photoelectric control system and is particularly concerned with such a system used for the purpose of identity mark control. As is well known in the art, the functioning of apparatus of this kind is based on the principle that an image of the luminous source or an entrance slit that may be considered as a luminous source is formed through an optical system on a movable contrast carrier and that the light influenced by the contrast carrier is directed to impinge upon a photoelectric detector. In such a system—with the contrast carrier in motion—the detector responds as soon as the image of the luminous source hits a contrast point of the contrast carrier which reflects or absorbs more or less light than the neighboring point of the contrast carrier. In general, printed packing material in the form of strip or tape with an identity mark brighter or darker in color imprinted thereon and thus forming a contrast point is used in packing machines. The response of the photoelectric control device to a discontinuity of contrast causes electromagnetic means to perform an action, e.g., the generation of a pilot signal or the actuation of a cut-off mechanism or the putting into action of any other working step of the packing machine.

One of the principal difficulties in conceiving and constructing such a photoelectric control apparatus resides in the fact that an apparatus suited for this purpose should be of universal usability for all kinds of contrast carriers, those which may have a great variety of reflecting powers or absorption capacities, and those where the colors of the contrast carrier background and the contrast point, i.e., the identity mark may be quite different. In other words, one has to face the possibility that in the one instance a dark green colored packing material with a black identity mark imprinted thereon (small reflecting power and unimportant contrast) is used in the packing machine, while in another instance a glossy and regularly reflecting packing foil with jet black identity mark (high reflecting power and intense contrast) may be used. It may even happen, e.g., that a dim red colored packing material is provided with a white identity mark, so that a negative discontinuity of contrast occurs when the identity mark passes the photoelectric eye.

The invention has therefore for its object the provision of an improved design of such a photoelectric apparatus permitting simple setting for the various kinds and colors of contrast carriers; an important requirement to be fulfilled in this line is that this setting of the apparatus may even be performed by non-expert personnel, e.g., the operator of the packing machine.

Theoretically, it is possible to modify the degree of amplification of an amplifier connected to the output of the detector, i.e., it can be adjusted to a defiinte, predetermined amplifier output voltage in order to effect balancing of the great differences in luminous flux received by the detector. Such a kind of setting has up to now been used. It is relatively complicated and critical and has the disadvantage that in the event of a high reflecting power of the contrast carrier too great a quantity of light is allowed to impinge upon the detector causing undue overload and consequently decrease of the service life of the detector.

Contrary to such a system, the object of the present invention is to provide a light intensity regulating device, preferably an attenuator and—in the output circuit of the detector—an electric indicating device wherein the light intensity regulating device is adjustable in accordance with the electric indicating device so that the luminous flux values received by the detector lie within the most favourable working range of the detector. This means that not the degree of amplification—as common in well known systems—but the quantity of light reaching the detector is adjusted in accordance with an electric signal generated in the output circuit of the detector. This offers the advantage that overloading of the detector is eliminated. If, however, the intensity of the luminous source should be made adjustable by means of a variable series resistance in order to equalize different reflecting powers of the contrast carrier, this would also cause a change of the colour temperature of the luminous source upon which depends the sensitivity of the detector and the use of accurately tuned filters. Preference should therefore be given to the use of an attenuator to effect regulation of luminous intensity. Neither the degree of amplification of the amplifier nor the color temperature of the luminous source is then changed, so that constant conditions are being maintained in this respect. It is important that the quantity of light impinging upon the detector is changed by a light regulating device, e.g., an attenuator, but that—in similar manner as with the adjustment of the degree of amplification—an electric signal of the detector output circuit, e.g., the amplifier anode potential is adopted as a basic value for adjustment.

It is another object of the invention further to improve the sensitivity of setting of the photoelectric control apparatus by the use of optical means that produce a mean value of the contrast. The light regulating device is then so adjusted that in response to this mean contrast value, an amplifier cut into the output circuit of the detector functions within the central range of the amplifier characteristic. During the process of setting, half of the image of the light source is formed on the lightest area of the contrast carrier and half of it is formed on the darkest area (identify mark), resulting in the obtaining of a mean value of the contrast. In order to simplify such a setting of the image formation of the luminous source it is reasonable to provide an optical deflection means, preferably a pair of prisms that forms a double image of the luminous source and can be temporarily introduced into the image forming ray path. It is then relatively simple to see that during the setting operation one of the images is formed on the brightest and the other on the darkest point of the contrast carrier. After setting has been completed, the optical deflection means is again removed from the image forming ray path, so that in the operating condition of the apparatus only one image of the luminous source is formed on the contrast carrier.

If the detector voltage is not intended to be used for modulation of a carrier frequency—which would pre-suppose the considerable expense of an interrupter for the luminous radiation—it is advisable to connect a direct-current amplifier into the output circuit of the detector, thus using a device that is considerably less complicated than an appliance operating with a carrier frequency. In both cases, there is the advantageous possibility of effecting a setting of the control apparatus in a static condition with a stationary contrast carrier, i. e., with the packing machine not in operation.

As in the output circuit of the detector, i. e., in the amplifier connected to this output circuit constant conditions are maintained, there is the convenient possibility of simply reversing the polarity of the detector if the controlling discontinuity of contrast should become negative, i. e., if control is to be effected in response to a bright identity mark on dark background. This simple possibility is not present and cannot be obtained without further difficulties if—as common in known systems of this kind—an adjustment of the degree of amplification is effected.

In the drawings:

FIG. 1 is a schematic diagram of the preferred embodiment of the invention;

FIG. 2 is a schematic diagram of an alternative form of the invention which may be used when the contrast carrier is of a transparent nature;

FIG. 3 is a schematic diagram of the electrical system comprising the electrical current source, the photoelectric tube, the amplifier, and the amplifier output indicator;

FIG. 4 is a graph of the amplifier tube characteristics showing a plot of plate voltage against grid voltage;

FIG. 5 shows a lenticular lens used for dispersing light from the reflected images;

FIG. 6 shows an optical means for concentrating the dispersed light on the photoelectric tube;

A mechanical embodiment of the invention is shown in FIGS. 7, 8, 9 and 10, in which:

FIG. 7 is a view taken from below the line 7—7 of FIG. 10 showing the attenuator and prism adjusting mechanism;

FIG. 8 is a cross-sectional view taken on line 8—8 of FIG. 7 and showing the prisms in a retracted position;

FIG. 9 is a cross-sectional view similar to FIG. 8 showing the prisms in engagement, and FIG. 10 is a cross-sectional view taken at line 10—10 of FIG. 9.

A preferred embodiment of the present invention is schematically represented in FIG. 1 of the accompanying drawings and will be more fully explained while reference is made to the circuit diagram (FIG. 3) and to the following detailed description.

The image of a luminous source 1, e.g., the coiled filament of an incandescent lamp is formed at 3 through an illuminating optical system 2 on a strip of packing material 4 that is passed in the direction of the arrow in front of the luminous source 1. Identity marks 5 forming a contrast to the priming of the strip 4 are provided at regular intervals on the strip of packing material 4 and within the reach of the image 3 of the luminous source 1. A concave reflector 6 forms an image of the illuminated portion of the strip 4 on a photoelectric cell 7. The photoelectric cell 7 is galvanically coupled with the grid 8 of an amplifying tube 9. An adjustable resistance 10 from which a definite voltage can be tapped and fed to an indicating glow lamp 11 is connected in the anode circuit of the amplifying tube 9. The anode circuit of the amplifying tube 9 is galvanically coupled to the grid of the thyratron amplifier 12, a pilot relay 13 and a break switch 14 being connected in the anode circuit of the thyratron amplifier. With the photoelectric cell 7 exposed to the radiant light, the voltage $Ug$ on the grid 8 is high and consequently, the grid potential of the thyratron amplifier 12 is below the ignition voltage. However, as soon as the photoelectric cell 7 is exposed to darkness by an identity mark 5 passing by, the potential of the grid 8 will drop, so that due to an increased anode voltage $Ua$, the thyratron ignites and causes the relay 13 to respond. This has the result that a control action is initiated which is of no interest within the scope of this invention, but which in addition to other functions also actuates the break swtch 14 and interrupts again the discharge in the thyratron 12. FIG. 4 shows the $Ug/Ua$ characteristic 15 of the amplifying tube 9. Adequate adjustment of the resistance 10 may be employed to cause the glow lamp 11 to ignite when a definite anode voltage is available and thus to indicate the presence of this definite anode voltage $Ua$. The resistance 10 is then permanently adjusted so that the glow lamp 11 ignites when the anode voltage $Ua$ has a value that lies approximately in the centre (15'), i.e., on the most sloping straight-lined portion of the curve 15. In order to ensure a safe response of the relay 13 even in case of weak contrasts between the priming of the strip material 4 and the identity mark 5, it is necessary to take appropriate precautions that use is made of the straight-lined sloping portion of the tube characteristics 15, i.e., that the grid potential $Ug$ varies at any discontinuity of contrast independently of the reflecting power of the strip 4 and the identity mark 5 within a corresponding range. Up to now one has tried to obtain this result by means of an appropriate adjustment of the grid resistance 16, such as by varying the degree of amplification. But such a balancing of the amplifier constitutes an unsafe measure, must be considered critical and can hardly be carried out by non-expert personnel. There is the danger that the photoelectric cell 7 may be overloaded due to too high a reflecting power of the strip material 4. The following optical setting means has therefore been provided in order to eliminate this danger: A variable attenuator 17 has been arranged within the ray paths of the optical illumination system 2, the attenuator 17 thus serving more or less to decrease the effective luminous flux without thereby to vary the color temperature of the luminous source 1. Furthermore, a pair of prisms 18, 18' is arranged in proximity of the optical system 2 and can be swung into the ray path, so that instead of the image 3, two images 3', 3" are formed in a close side-by-side position. By moving the strip 4, one of the images (image 3') may be made to lie on the identity mark 5 while the other (image 3") has its position closely beside the first one. Under this condition, the photoelectric cell 7 is sensitized by a mean value of luminous flux that is influenced by the reflecting power of the strip 4 and also by the reflecting power of the identity mark 5. It is now possible to adjust the attenuator 17 until ignition of the glow lamp 11 is just obtained. The result of this simple and convenient adjustment, which can be carried out by everybody not skilled in this particular field, is that a mean anode voltage $Ua$ within the range 15' of the characteristic corresponds to the mean luminous flux value. The pair of prisms 18, 18' is then again swung out of the ray path after this adjustment has been completed. It is possible in this manner, with materially different contrast carriers 4, 5, to adjust the mean luminous flux impringing upon the photoelectric cell 7 to a constant value and to obtain optimum adaptation to the amplifier.

If the identity mark is brighter than the priming of the strip 4, the photoelectric cell 7 must be connected with reversed polarity to the amplifying tube 9 as indicated at 7'. This polarity reversal of the photoelectric cell 7' may be carried out in a most simple manner by means of a commutator 16', the switch positions of which may be marked "bright identity mark" and "dark identity mark."

FIG. 2 shows in schematic representation a modified embodiment of the invention which is particularly suitable for transparent contrast carriers 4', 5'. Here, the photoelectric cell 7 is arranged beneath the contrast carrier 4', 5'. A condenser lens 6' assumes in this embodiment the function of forming an image of the transparent contrast point on the photoelectric cell 7.

As is well known, it is desirable for the sake of a long service life of the photoelectric cell that the photoelectric cathode is illuminated on a surface as large as possible and to distribute the luminous flux impinging thereon. Diffused dispersion means, e.g., ground glass cause too great a loss of luminous intensity when used for this purpose. It is for this reason that a lenticular screen is used to obtain the desired result. If during adjustment two images 3', 3" of the luminous source are formed by means of the prisms 18, 18', this has the result that likewise two light spots—it is true, enlarged by the action of the lenticular screen—are formed on the photoelectric cell. But as the sensitivity of a photoelectric cell may regionally be considerably different, there is a new source of error caused by the side-by-side position of the light spots. This source of error can be eliminated by having the lenticular screen 19 provided with an additional refractive power which has the result that a union of the two light spots enlarged by the effect of the lenticular screen is obtained on the photoelectric cell 7. As shown in FIG. 5, the lenticular screen 19' may be combined for this purpose with a cylindrical condenser lens 19". However, there is also the possibility, as shown in FIG. 6, of giving the individual lenses 20, 20' of the screen different curvatures, so that the necessary additional refractive power is produced in this way.

In the mechanical embodiments shown in FIGS. 7-10, the component parts are shown enclosed in a housing 21. A light bulb 1a having a filament 25 emits a beam of light which is condensed by a compound optical system comprised of a group of compound lenses 22, 23, and 24, focusing the light beam to produce an image 25a of the bulb filament 25 on the contrast carrier 26. A light attenuator comprised of two adjustable leaves 27 and 28 control the amount of light reaching the contrast carrier 26. A pair of prisms 29 and 30 are retractably mounted beneath the attenuators 27 and 28. In the normal operating position as shown in FIG. 8, they are retracted so that only a single image of the light source 25 reaches the contrast carrier 26. In FIG. 9 the prisms are shown in engagement where the light beam is divided into two parts, forming a double image 25b and 25c on the contrast carrier 26. A screw adjustment 31 is provided for focusing the light to form images 25a, 25b, and 25c. In FIG. 7 the solid lines show the prisms 29 and 30 in closed position while the broken lines 29a and 30b show the prisms in retracted position. An adjusting knob 32 is provided for closing and retracting the prisms, and an adjusting knob 33 is provided for varying the opening of the attenuator.

The reflected light from images 25a, 25b, and 25c is gathered and convergedd by lens 24 and directed against concave mirror 34 which further converges the light beam and directs it against a flat mirror 35 which in turn reflects the beam through a transparent window 36 supported on a holder 37. The light beam then strikes the cathode plate of the photoelectric cell 38. A glow lamp 39 is mounted on bracket 40 to give a visual indication of the light intensity striking the photoelectric cell 38. The mirror 35 serves to enable the equipment to be made more compact and the components more conveniently placed.

In operation the apparatus is adjusted by turning adjusting knob 32 to engage the prisms, separating the light beam into two components, 25b, 25c. The contrast carrier is moved until one component falls on a light area and the other on a dark area, that is, one on the indicating mark and one on the adjacent background surface. Adjusting knob 33 is then varied until the glow lamp 39, which is connected to the output of an external amplifier, which amplifier is in turn connected to the output of the photoelectric tube, first begins to glow. Adjusting knob 32 is then reversed to retract the prisms and normal operation can then be commenced, as for example in the control of packaging machinery.

The principle of the present invention disclosed hereinbefore may also be realized in a manner other than shown in the preferred embodiments selected for illustration without thereby departing from the scope and nature of the invention. It is possible, for instance, to renounce a formation of the mean value of luminous flux and with appropriate setting of the ignition point of the glow lamp 11, adjustment can be made in accordance with a maximum or minimum luminous flux. It is further possible to employ other means to obtain the formation of a mean value of the luminous flux, e.g., only one prism may be used instead of a pair of prisms 18, 18'. Moreover, a measuring instrument may be used instead of the indicating blow lamp, or a light sensitive transistor may be employed in place of a photoelectric cell.

Invention is claimed as follows:

1. An apparatus for photoelectric control comprising in combination a housing in which is contained a light source, an optical system for producing a light beam from said light source upon a movable contrast carrier, a mechanical attenuator for regulating the magnitude of the beam from said light source, a plurality of optical prisms having their apexes faced toward each other and being retractably mounted so that in their closed position the apexes thereof are engaged in a line through the central axis of said light beam, a photoelectric tube, an obliquely positioned mirror to reflect the light beams from said contrast carrier toward the plate of said photoelectric tube, and an optical system for condensing the reflected light from said mirror upon the plate of said tube, the arrangement being such that said optical means may be inserted temporarily for adjustment purposes to form two images of said light source on said contrast carrier, said two images being formed, respectively, on a light area and on a dark area of said contrast carrier whereby said light beam may be adjusted until the light from both images reaching said photelectric tube is of a predetermined optimum magnitude permitting operation of said tube within the most favorable operating range thereof.

2. A photoelectric control system for detecting light modification contrasts on a contrast carrier comprising, in combination, a light source, an optical system arranged to direct a beam from said light source onto said contrast carrier, retractably mounted optical means for splitting said light beam into two parts comprising a pair of optical prisms having their apexes faced toward each other and being retractably mounted so that in the closed positions the apexes are engaged at a line through the central axis of the light beam, photoelectric means for detecting light from the images formed by said light beam on said contrast carrier, amplifying means connected to said photoelectric means for amplifying the electric impulses produced by said photoelectric means, an amplifier output level indicating means, and means for regulating the magnitude of the beam from said light source, the arrangement being such that said optical means may be inserted temporarily for adjustment purposes to form two images of said light source on said contrast carrier, said two images being formed, respectively, on a light area and on a dark area of said contrast carrier whereby said light beam may be adjusted until the light from both images reaching said photoelectric detecting means is of a predetermined optimum magnitude permitting operation of said detecting means within the most favorable operating range thereof.

3. A photoelectric control system for detecting light modification contrasts on a contrast carrier comprising, in combination, a light source, an optical system arranged to direct a beam from said light source on said contrast carrier, retractably mounted optical means for splitting said light beam into two parts to form two spaced apart real images on said contrast carrier, means for regulating the magnitude of the beam from said light source so positioned as to control the intensity of said light beam before it reaches said beam splitting means; said light source, said beam regulating means, and said beam splitting means being so aligned as to provide a constant intensity ratio between the two parts of said beam, photoelectric means for detecting light from the images formed by said light beam on said contrast carrier, amplifying means connected to said photoelectric means for amplifying the electric impulses produced by said photoelectric means, and an amplifier output level indicating means, the arrangement being such that said optical means may be inserted temporarily for light intensity adjustment purposes to form two spaced apart real images of said light source on said contrast carrier, said two images being formed respectively on a light area and on a dark area of said contrast carrier, whereby said light beam regulating means may be adjusted until the light from both images reaching said photoelectric detecting means is of a predetermined optimum magnitude permitting operation of said detecting means within the most favorable operating range thereof upon retraction of said beam splitting means for contrast measurements.

4. A photoelectric control system according to claim 3 wherein said light regulating means is an attentuator interposed between said light source and said photoelectric means.

5. A photoelectric control system according to claim 3 wherein said light regulating means is a mechanical attenuator interposed between said light source and said photoelectric means.

6. A photoelectric control system according to claim 3 wherein said amplifying means is an electronic direct current amplifier, and wherein said amplifying means output indicator is a glow lamp responsive to a predetermined voltage.

7. A photoelectric control system according to claim 3 wherein a polarity reversing switch is provided to reverse the polarity of said photoelectric detecting means to allow for normal operation where said movable contrast carrier provides a reverse contrast.

8. A photoelectric control system according to claim 2 wherein said light regulating means is a mechanical attenuator interposed between said light source and said optical prisms.

9. A photoelectric control system according to claim 2 wherein a lenticular screen having the function of a dispersing means is positioned in front of said photoelectric detecting means and wherein said screen is provided with an additional optical system to obtain a union of the two beams dispersed by the effect of the lenticular screen to form a combined light beam on the photoelectric means.

References Cited in the file of this patent

UNITED STATES PATENTS

| | | |
|---|---|---|
| 2,429,331 | Sachtleben | Oct. 21, 1947 |
| 2,612,817 | Willcox | Oct. 7, 1952 |
| 2,665,388 | Bickley | Jan. 5, 1954 |
| 2,730,009 | Poirette | Jan. 10, 1956 |

FOREIGN PATENTS

| | | |
|---|---|---|
| 682,519 | France | Feb. 17, 1930 |